(12) United States Patent
Koike et al.

(10) Patent No.: US 6,344,130 B1
(45) Date of Patent: Feb. 5, 2002

(54) METHOD FOR CONTINUOUSLY GENERATING HIGHLY CONCENTRATED OZONE GAS

(75) Inventors: Kunihiko Koike; Goichi Inoue; Tatsuo Fukuda, all of Moriyama (JP)

(73) Assignee: Iwatani Sangyo Kabushiki Kaisha (Iwatani International Corporation) (JP)

( * ) Notice: Subject to any disclaimer, the term of this patent is extended or adjusted under 35 U.S.C. 154(b) by 0 days.

(21) Appl. No.: 09/443,346

(22) Filed: Nov. 19, 1999

(51) Int. Cl.$^7$ ................................................ C25C 1/00
(52) U.S. Cl. .................... 205/626; 422/186.11
(58) Field of Search ................ 422/186.07, 186.11, 422/186.12, 186.14, 186.2; 205/626

(56) References Cited

U.S. PATENT DOCUMENTS

| | | | | |
|---|---|---|---|---|
| 3,963,625 A | * | 6/1976 | Lowther | 422/186.11 |
| 4,462,965 A | * | 7/1984 | Azuma et al. | 422/186.08 |
| 5,520,887 A | * | 5/1996 | Shimizu et al. | 422/186.08 |
| 5,888,271 A | * | 3/1999 | Tanimura et al. | 95/12 |

* cited by examiner

*Primary Examiner*—Kathryn Gorgos
*Assistant Examiner*—Wesley A. Nicolas
(74) *Attorney, Agent, or Firm*—Bacon & Thomas, PLLC (57) ABSTRACT

A method for generating highly concentrated ozone gas by adsorbing ozone gas generated by an ozonizer with an absorbent within an adsorption column and then separating highly concentrated ozone gas from the adsorption column. Three adsorption columns are arranged in parallel. Each of the adsorption columns is controlled to repeat four steps of an ozone gas adsorbing step, a stabilizing and pressurizing step, an ozone gas desorbing step and a cooling down step. Each of the ozone gas adsorbing step and the ozone gas desorbing step has operation time set twice the operation time of each of the stabilizing and pressurizing step and the cooling down step. An ozone gas concentrating unit comprises three adsorption columns which are set to operate one after another by ⅓ cycle lag. Highly concentrated ozone gas separated at the desorbing step of each adsorption column is once stored in an ozone gas storage vessel.

3 Claims, 6 Drawing Sheets

1 : Adsorption   2 : Stabilization & Pressurizing
3 : Desorption   4 : Cool down

METHOD FOR CONTINUOUSLY GENERATING HIGHLY CONCENTRATED OZONE GAS

BACKGROUND OF THE INVENTION

1. Field of the Invention

The present invention relates to a technique for generating highly concentrated ozone gas and particularly to a method and an apparatus for continuously generating highly concentrated ozone gas.

2. Description of Prior Art

There is conventionally proposed an apparatus for concentrating ozone gas which supplies to adsorption columns each filled with silica gel or the like adsorbent, ozone gas, generated by an ozonizer and controls a temperature of the adsorbent within each ozone gas adsorption column, thereby enabling the adsorbent to adsorb and desorb the ozone gas (International Publication WO96/24554).

This conventional apparatus for concentrating ozone gas comprises a plurality of adsorption columns arranged in parallel with each other and each filled with an adsorbent which gives priority to ozone gas adsorption. And it controls a temperature of the adsorbent within each adsorption column, thereby enabling the adsorbent to adsorb and desorb the ozone gas and supplies the concentrated ozone gas desorbed from each adsorption column under a constant pressure to an ozone using installation (user) through a concentration stabilizer.

3. Problems Presented by the Prior Art

Even in the case where ozone gas of about 5 to 7 vol % generated by an ozonizer is selectively saturation-adsorbed by cooled silica gel or the like adsorbent to concentrate it, the adsorbent adsorbs oxygen together with ozone gas. Therefore, the ozone gas can be concentrated only to the degree of about 70 vol %. Further, as for an apparatus which effects the ozone gas desorption by regulating a temperature of the adsorbent, it is well known the desorbed ozone gas changes its concentration and flow amount depending on the regulated temperature as time goes by and therefore does not stabilize itself. Besides, the conventional apparatus is arranged to take out the concentrated ozone gas from the adsorption column with scavenging gas when desorbing the ozone gas from the adsorption column. The thus taken out concentrated ozone gas reduces its concentration by an amount corresponding to the used amount of the scavenging gas. Accordingly, there was a problem it was difficult to send ozone gas of a constant concentration in a constant flow amount to an ozone gas using installation.

SUMMARY OF THE INVENTION

The present invention has an object to provide a method and an apparatus for generating highly concentrated ozone gas which can supply ozone gas of a constant concentration in a constant flow amount.

The present invention has another object to provide a method for concentrating ozone gas which enables an ozone gas adsorbent to adsorb ozone gas in a high concentration.

According to a first aspect of the present invention, there is provided a method for generating highly concentrated ozone gas which adsorbs ozone gas generated by an ozonizer with an adsorbent within each of adsorption columns and then supplies highly concentrated ozone gas separated from the adsorbent to an ozone gas using installation. In this method, an ozone gas concentrating unit comprises three adsorption columns arranged in parallel with each other and each filled with an adsorbent. Every adsorption column of this ozone gas concentrating unit is controlled so as to repeat four steps of: an ozone gas adsorbing step; a stabilizing and pressurizing step; an ozone gas desorbing step; and a cooling down step. Each of the ozone gas adsorbing step and the ozone gas desorbing step has operation time set twice the operation time of each of the stabilizing and pressurizing step and the cooling down step. The three adsorption columns composing the ozone concentrating unit are set to operate one after another by ⅓ (one third) cycle lag. The highly concentrated ozone gas separated at the desorbing step of each adsorption column is stored in an ozone gas storage vessel, from which the highly concentrated ozone gas is supplied to the ozone gas using installation after a flow controller has regulated its flow amount to a constant one.

According to a second aspect of the present invention, there is provided a method which includes adsorbing ozone gas with an ozone gas adsorbent and reducing an inner pressure of each ozone gas adsorption column. The second aspect of the invention further includes reducing the inner pressure to not more than a partial pressure of ozone gas.

According to another general aspect of the present invention, there is provided an apparatus for generating highly concentrated ozone gas which comprises ozone gas adsorption columns each filled with an ozone gas adsorbent and an ozonizer connected thereto, each ozone gas adsorption column being thermally controlled. In this apparatus, an ozone gas concentrating unit comprises three adsorption columns arranged in parallel with each other. Each of the adsorption columns has a gas introduction inlet connected to a common gas introduction valve. An ozonizer is arranged in the common gas introduction passage. Each of the adsorption column composing the ozone gas concentrating unit has a gas lead-out outlet continued to a gas lead-out passage, which is connected to a common gas discharge passage and a common gas take-out passage through respective flow passage switch-over valves. An ozone gas decomposer is interposed in the common gas discharge passage. The common gas take-out passage is connected to an ozone gas storage vessel. The respective adsorption columns in the ozone gas concentrating unit are adapted to change their operation modes one after another by ⅓ cycle.

The present invention combines into one set three ozone gas adsorption columns, each of which gives priority to ozone gas adsorption through being cooled and heated. Each of the ozone gas adsorption columns operates in a cycle which comprises an ozone gas adsorbing step, a stabilizing and pressurizing step, an ozone gas desorbing step and a cooling down step. Each of the ozone gas adsorbing step and the ozone gas desorbing step has operation time set twice the operation time of each of the stabilizing and pressurizing step and the cooling down step. The respective ozone gas adsorption columns operate one after another by ⅓ cycle lag. Accordingly, it is possible to make constant the concentration and flow amount of the ozone gas generated by the ozonizer. In addition, the ozone gas storage vessel is adjusted to once store the ozone gas led out of each adsorption column without employing carrier gas and therefore can absorb the change of concentration of the ozone gas separated from each adsorption column to result in a possibility of continuously supplying highly concentrated ozone gas to the ozone gas using installation.

DETAILED DESCRIPTION OF PREFERRED EMBODIMENTS

Figure 1:
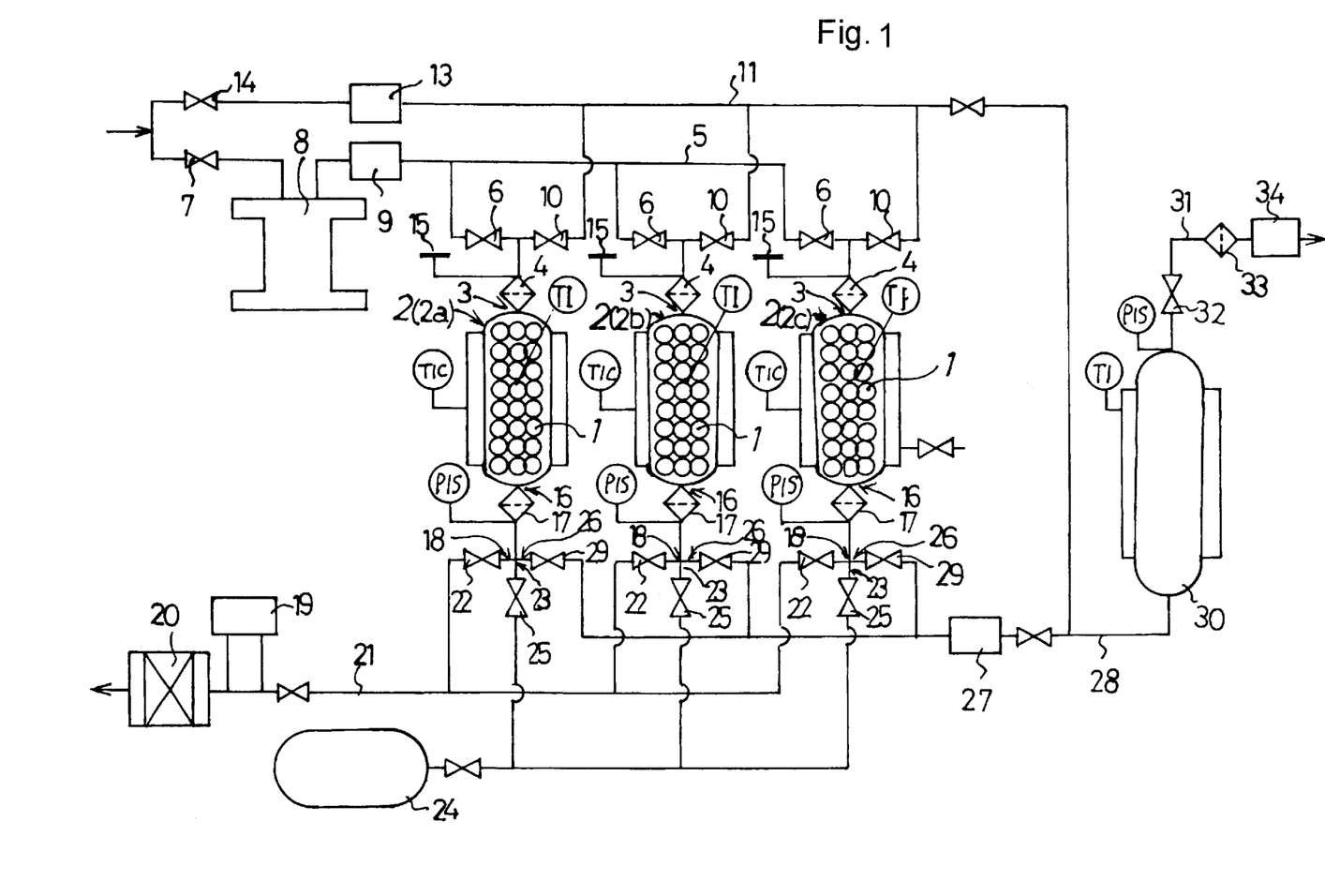
FIG. 1 is a system diagram of an apparatus for concentrating ozone gas which shows an embodiment of the present invention.

This apparatus for concentrating ozone gas comprises three adsorption columns 2 arranged in parallel with each other and each filled with silica gel or the like adsorbent 1 which selectively adsorbs ozone gas. Each of the adsorption columns 2a, 2b and 2c has a gas introduction inlet 3 with an inflow side filter 4 attached thereto. The respective inflow side filters 4 are connected to a common gas introduction passage 5 through flow passage opening and closing valves 6. A flow passage shut-off valve 7, an ozonizer 8 and a mass flow controller 9 are arranged in the common gas introduction passage 5 in order from an upstream side of a gas supply system. The flow passage shut-off valve 7 is connected to a source of oxygen (not shown), material of ozone gas, such as a liquid oxygen storing container.

Additionally, the inflow side filters 4 are connected through opening and closing valves 10 to an oxygen passage 11 arranged in parallel with the common gas introduction passage 5. A mass flow controller 13 and a flow passage shut-off valve 14 are arranged in the oxygen passage 11. The flow passage shut-off valve 14 is connected to the oxygen source. Each of the inflow side filters 4 has an inlet side, attached to which is a rapture disk 15 of 9.9 kg/cm$^2$ G·(0.971 Mpa·G) design rapture pressure as a safety measure for a rapid pressure-rising like ozone explosive decomposition.

Each of the adsorption columns 2a, 2b and 2c has a gas lead-out outlet 16 with an outflow side filter 17 attached thereto. Each of the outflow side filters 17 has an outlet branched and opened in three ways. A first branched opening 18 is connected through a first opening and closing valve 22 to a common gas discharge passage 21 in which an ozone gas concentration meter 19 of ultraviolet ray absorption type and an ozone gas decomposer 20 of catalyst type are interposed. A second branched opening 23 is connected to a common ozone gas recovery tank 24 through a second opening and closing valve 25. A third branched opening 26 is connected through a third opening and closing valve 29 to a common ozone gas take-out passage 28 to which a mass flow meter 27 is attached. The ozone gas take-out passage 28 is connected to an ozone gas storage vessel 30 in communication therewith. The ozone gas recovery tank 24 serves to safely discharge and recover the gas within the adsorption columns 2a, 2b and 2c in the case where abnormal pressure-rising is detected in any one of the adsorption columns 2a, 2b and 2c.

The ozone gas storage vessel 30 is connected to an ozone gas using installation (not shown) with an ozone gas leading passage 31. The ozone gas leading passage 31 has an outlet valve 32, a filter 33 and a mass flow controller 34 arranged therein in the mentioned order from the ozone gas storage vessel 30.

The respective adsorption columns 2a, 2b and 2c as well as the ozone gas storage tank 30 are cooled by a cooling device which utilizes ethanol as a coolant. A tape heat attached to each cooling jacket is adjusting to thermally control their cooling condition. A piping system in this ozone gas concentrating apparatus employs electrolytically polished pipes of SUS 316 L except a portion connecting to the rupture disk. All of the valves adopt pneumatically operated valves of diaphragm type. The electrolytic polishing is applied to portions which contact with ozone gas such as inner surfaces of the adsorption columns other than the piping.

Next, explanation is given for procedures of continuously concentrating ozone gas with the use of the above-mentioned ozone gas concentrating apparatus.

Figure 2:
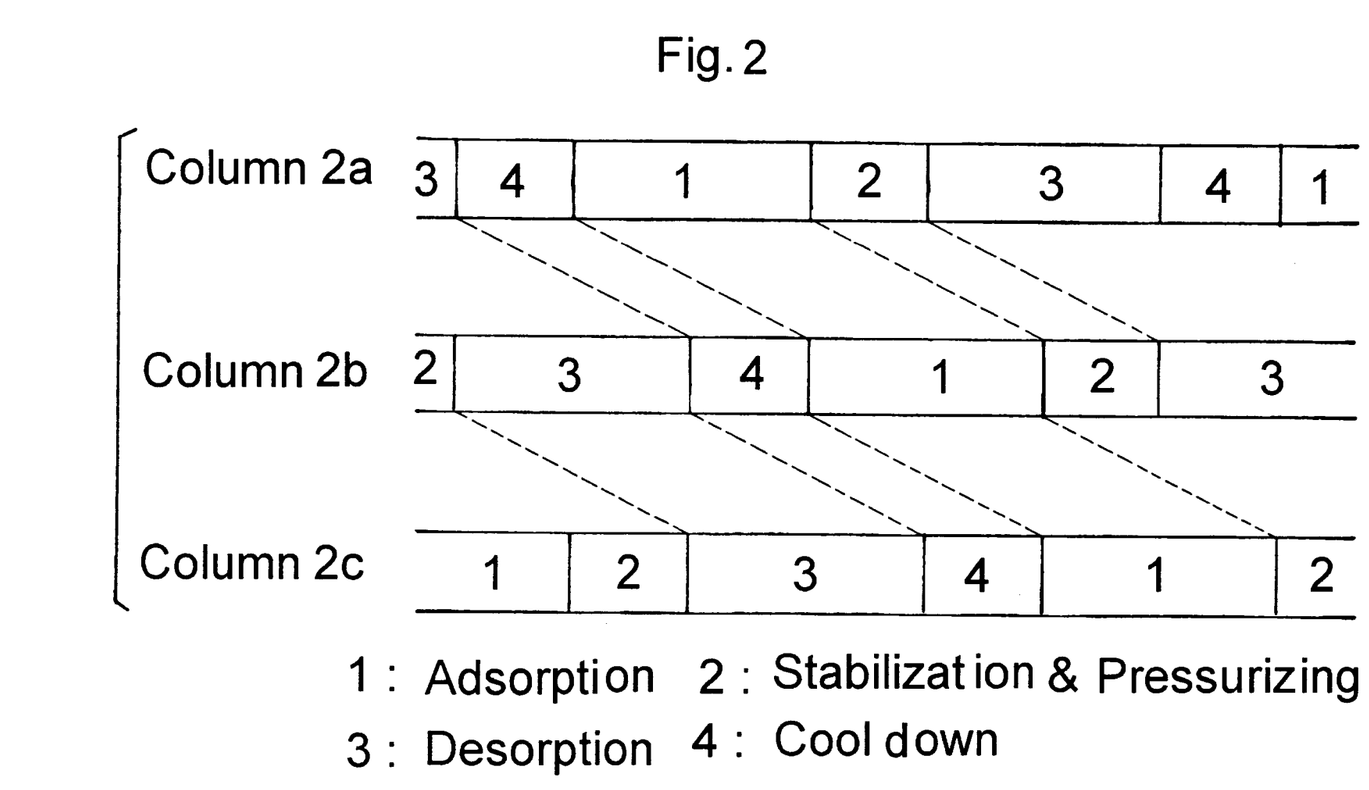
FIG. 2 is a time chart indicating an operation cycle of each adsorption column.

Each of the adsorption columns 2a, 2b and 2c is controlled to repeat four steps of an ozone gas adsorbing step, a stabilizing and pressurizing step, an ozone gas desorbing step and a cooling down step, as one cycle. As for operation time of one cycle, on condition that operation time of the ozone gas adsorbing step is (T), operation time of the ozone gas desorbing step is set to the same (T) as that of the adsorbing step and operation time of each of the stabilizing and pressurizing step and the cooling down step is set to half of the (T), the operation time of the ozone gas adsorbing step. In consequence, each of the adsorption columns 2a, 2b and 2c operates in one cycle for a period of three times the operation time of the ozone gas adsorbing step. And the respective adsorption columns 2a, 2b and 2c operate one after another by ⅓ (one third) cycle lag as shown in FIG. 2.

Hereafter, each step is explained by taking the adsorption column 2a as an example.

At the ozone gas adsorbing step, the adsorption column 2a opens the flow passage opening and closing valve 6 and at the same time the first opening and closing valve 22, thereby flowing therethrough ozone-oxygen mixture gas containing ozone gas generated by the ozonizer 8. At this time, the adsorption column 2a is cooled with the coolant supplied to the cooling jackets. The adsorbent 1 within the adsorption column 2a is cooled to about −60 degrees C. (213 K). Within the adsorption column 2a, the adsorbent 1 selectively adsorbs ozone gas, and oxygen of carrier gas and a portion of ozone gas pass through the gas discharge passage 21 to be decomposed by the ozone gas decomposer 20 of catalyst type and then be discharged to the exterior area.

Figure 3:
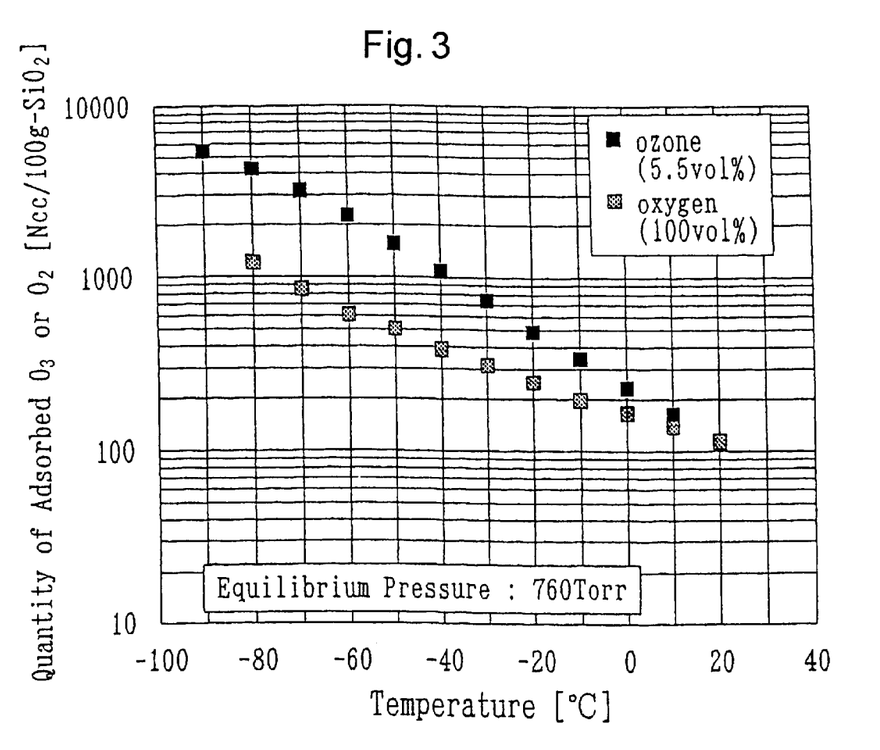
FIG. 3 is a graph showing a relationship between a temperature of an ozone gas adsorbent and an amount of an ozone gas adsorption.

In this case, the ozone gas generated by the ozonizer 8 is contained in oxygen gas in a concentration of about 6 vol. %. This ozone-oxygen mixture gas is forced into the adsorption column 2a under the atmospheric pressure in a flow amount of 2 to 3 SLM (standard liter per minutes). The adsorption of the ozone gas to the adsorbent at the adsorbing step is mainly a physical adsorption. As shown in FIG. 3, it depends on temperature so greatly that the adsorption amount increases as the temperature decreases.

At the stabilizing and pressurizing step, the adsorption column 2a closes both the flow passage opening and closing valve 6 on the introduction side and the first opening and closing valve 22 on the lead-out side and is left as it is for a little time. Thereafter, the adsorption column 2a increases its temperature at a temperature-raising speed of, for example, 1 degrees C./min. Along with this temperature increase, the adsorption column 2a increases its inner pressure.

At the ozone gas desorbing step, with the adsorption column 2a keeping its increased temperature, the third opening and closing valve 29 on the lead-out side is opened to send ozone gas within the adsorption column 2a to the ozone gas storage vessel 30 owing to a pressure difference between an inner pressure of the adsorption column 2a and that of the ozone gas storage vessel 30. At this time, the adsorption column 2a increases its temperature at a temperature-raising speed of, for example, 1 degrees C./min as well as at the stabilizing and pressurizing step. The ozone gas storage vessel 30 is cooled to −55 degrees C.

Figure 4:
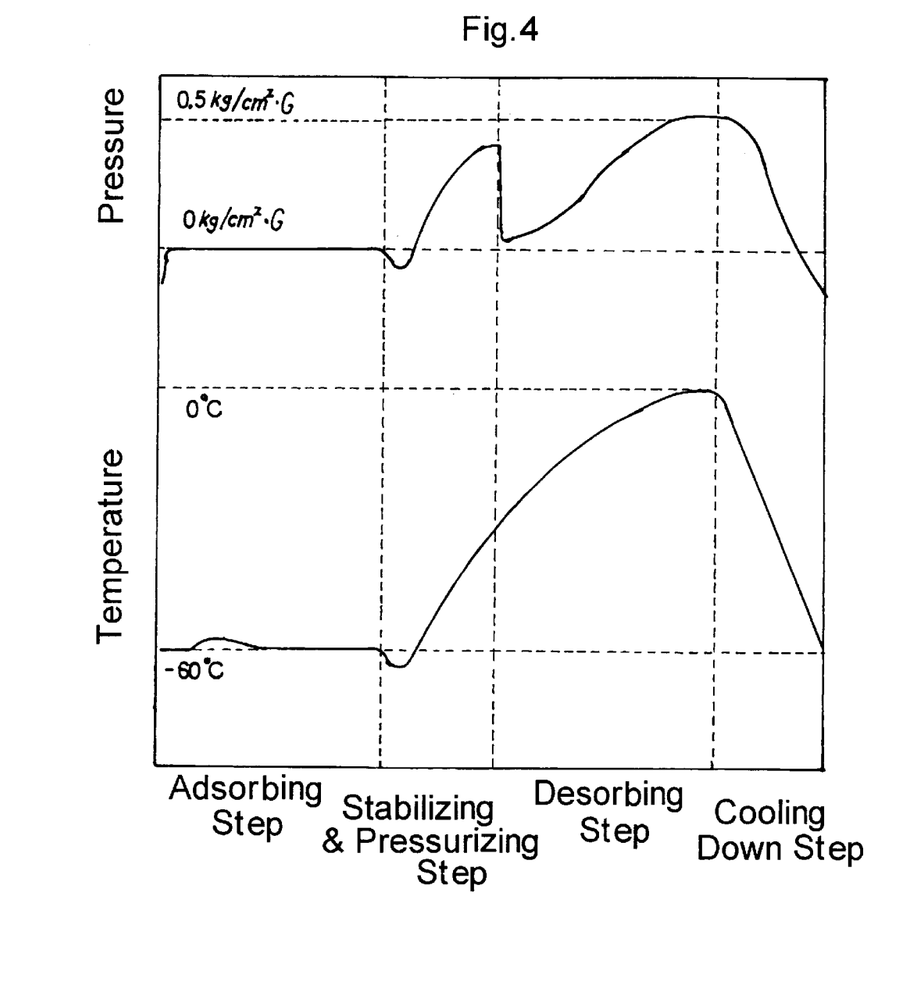
FIG. 4 is a graph showing change of an inner temperature and an inner pressure of each adsorption column at each step.

At the cooling down step, the adsorption column 2a closes both the flow passage opening and closing valve 6 on the introduction side and the third opening and closing valve 29 on the lead-out side and is cooled to −60 degrees C. so as to prepare for the next absorbing step. During this one cycle, the adsorption column 2a changes its inner temperature and pressure as shown in FIG. 4.

In a process of adsorbing ozone gas at −60 degrees C. and desorbing it through a thermal swing to 0 degrees C., when simply calculating a difference of adsorption amount between both the above temperatures in FIG. 3, it is estimated that the separated gas includes ozone gas in 82 vol % concentration and the total separated gas amount is 8270 Ncc. However, in practice, when moving to the desorbing step, the adsorption columns and the piping remain filled with ozone gas of a low concentration which was supplied at the absorbing step and ozone gas is decomposed to oxygen in quite an amount when it is desorbed from silica gel. Therefore, with a test apparatus, the separate gas included ozone gas in 28.4 vol % concentration and the total desorbed gas amount was 4800 Ncc.

The other adsorption columns 2b and 2c also perform the above-mentioned steps. At that time, they operate one after another by ⅓ cycle lag. Thus, without failure, one of the three adsorption columns is at the adsorbing step and another is at the desorbing step, which results in continuously adsorbing and desorbing ozone gas in the ozone gas concentrating unit. In consequence, the ozonizer 8 can always operate at a constant output, which leads to a possibility of stabilizing the concentration of the generated ozone gas and besides stably supplying the ozone gas to the ozone gas storage vessel 30. The ozone gas is supplied from the ozone gas storage vessel 30 through the ozone gas take-out passage 31 to the ozone gas using installation such as an ozone gas ashing apparatus. The mass flow controller 34 is interposed in the ozone gas leading passage 31, so that the highly concentrated ozone gas stored in the ozone gas storage vessel 30 can be supplied to the ozone gas using installation in a constant flow amount.

At the desorbing step through the thermal swing, the desorbed ozone gas changes its concentration and flow amount depending on the temperature as time goes by. The present invention adapts the ozone gas storage vessel 30 so as to once store whole amount of the desorbed ozone gas, which entails a possibility of stabilizing the concentration of the ozone gas to be sent to the ozone storage vessel 30 as time goes by.

Figure 5:
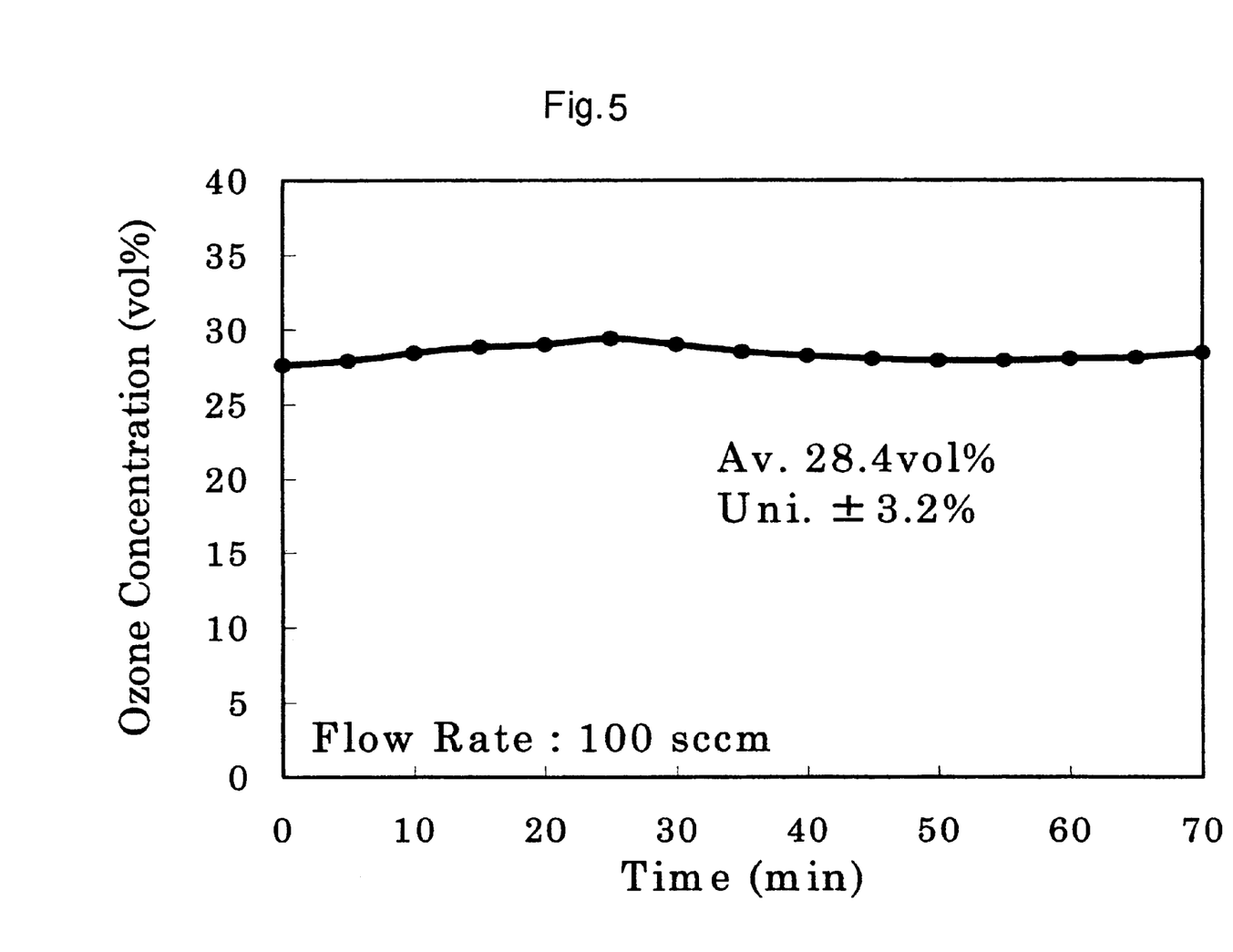
FIG. 5 is a graph showing a relationship between elapse of time and ozone gas concentration of separated gas at a desorbing step.

In the case of filling 335 g of silica gel having a high purity of 99.95% into each adsorption column 2 of 1 liter inner volume and using an ozonizer 8 which has maximum oxygen flow amount of 10 SLM and maximum generated ozone gas concentration of 7 vol %, the ozone gas concentration of the gas separated at the desorbing step of each adsorption column 2 changed as shown in FIG. 5. As it can be also seen from FIG. 5, the ozone gas concentration of the separated gas was almost constant and it was possible to obtain concentrated ozone gas having an average concentration of 28.4% and a concentration homogeneity of ±3.2%.

Figure 6:
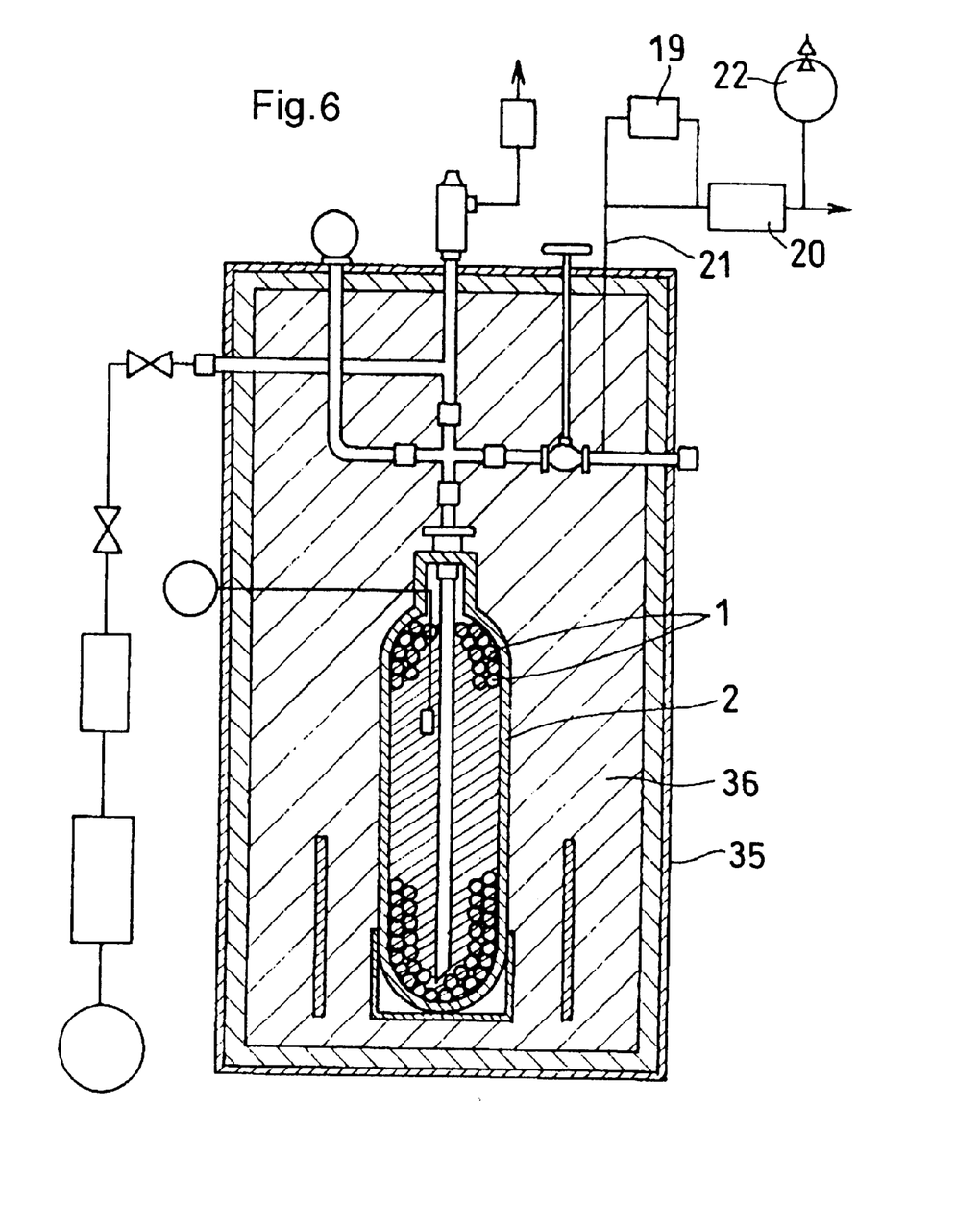
FIG. 6 is a vertical sectional view illustrating a different embodiment of the adsorption column.

FIG. 6 shows a different embodiment of the adsorption column 2. This embodiment accommodates the adsorption column 2 filled with the adsorbent 1 in an outer box formed from a heat insulated box 35. The adsorption column 2 is cooled to −78 degrees C. with snowy dry ice 36 stored in the outer box.

A vacuum pump 22 is arranged downstream of the ozone gas decomposer 20 in the gas discharge passage 21 in which the ozone gas concentration meter 19 of ultraviolet ray absorption type and the ozone gas decomposer 20 of catalyst type are interposed.

When supplying ozone gas of about 6 vol % generated by the ozonizer 8 to this adsorption column 2, the adsorbent 1 selectively adsorbs the ozone gas to concentrate it to about 70 vol %. At this time, the adsorbent 1 adsorbs oxygen as well.

Subsequently, the adsorption column 2 reduces its inner pressure about to a partial pressure of the supplied ozone gas. Owing to this pressure reducing operation, the adsorbent 1 separates and discharges oxygen prior to all others in an attempt to retain the partial pressure ratio between ozone and oxygen at gaseous phase when conducting the saturation adsorption. Thus the ozone gas within the storage vessel can be concentrated theoretically to 100 vol % and in fact to at least 90 vol %.

What is claimed is:

1. A method for generating highly concentrated ozone gas which comprises adsorbing ozone gas generated by an ozonizer (8) with an adsorbent (1) within each of a plurality of adsorption columns (2) and supplying only highly concentrated ozone gas obtained by desorbing it from the adsorbent (1) to an ozone gas using installation, wherein an ozone concentrating unit comprises three adsorption columns (2) arranged in parallel with each other and each filled with the adsorbent (1), in this unit each of the adsorption columns (2) being controlled so as to repeat four steps comprising an ozone gas adsorbing step, a stabilizing and pressurizing step, an ozone gas desorbing step and a cooling down step, each of the ozone gas adsorbing step and the ozone gas desorbing step having an operation time set twice the operation time of each of the stabilizing and pressurizing step and the cooling down step, the three adsorption columns (2) composing the ozone concentrating unit being set to operate consecutively by a ⅓ (one third) cycle lag, wherein the desorption step includes increasing the temperature of the adsorption column so as to increase the pressure therein and urging desorption of the ozone gas, said ozone gas only releasing from said absorbent as a result of the increase of temperature and pressure within said adsorption column, and said method includes storing only highly concentrated ozone gas separated at the desorbing step of each adsorption column (2) in an ozone gas storage vessel (30), from which only the highly concentrated ozone gas is supplied to the ozone gas using installation after a flow controller (34) has regulated its flow amount to a constant one.

2. A method for concentrating ozone gas which comprises: cooling ozone gas adsorption columns (2) each filled with an ozone gas adsorbent (1);

supplying ozone gas generated by an ozonizer (8) to each adsorption column (2) so as to enable the adsorbent (1) within each adsorption column (2) to effect an ozone gas saturation adsorption; and reducing an inner pressure of each adsorption column (2) by decreasing only the temperature of said adsorption column while maintaining said ozone gas therein, said temperature of said adsorption column during cooling being decreased by a cooling jacket surrounding said adsorption column and having a liquid cooling fluid circulating therethrough.

3. The method as set forth in claim 2 which comprises reducing the inner pressure of each ozone gas adsorption column (2) to not more than a partial pressure of the supplied ozone gas.

* * * * *